Sept. 8, 1931.
L. A. UMANSKY
1,822,759
MOTOR CONTROL SYSTEM
Filed Dec. 31, 1928
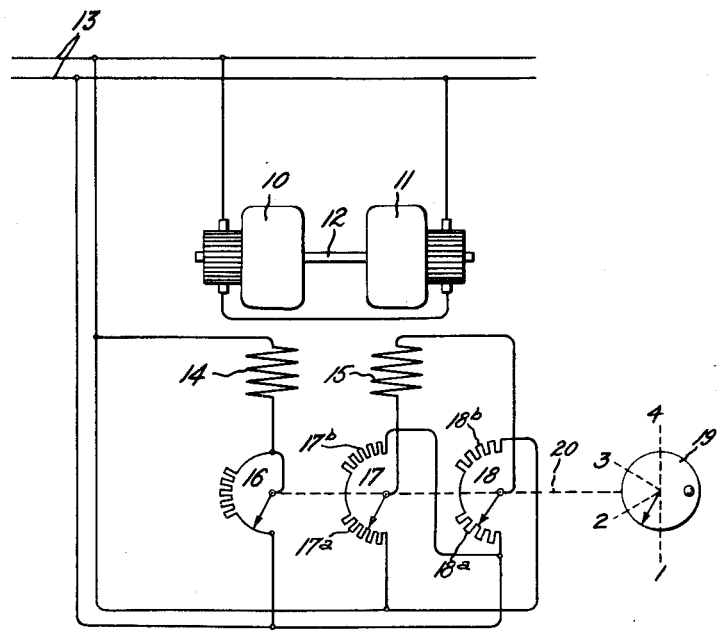
Inventor:
Leonid A. Umansky,
by Charles E. Tullar
His Attorney.

Patented Sept. 8, 1931

1,822,759

UNITED STATES PATENT OFFICE

LEONID A. UMANSKY, OF SCHENECTADY, NEW YORK, ASSIGNOR TO GENERAL ELECTRIC COMPANY, A CORPORATION OF NEW YORK

MOTOR CONTROL SYSTEM

Application filed December 31, 1928. Serial No. 329,651.

My invention relates to motor control systems, more particularly to direct current motor control systems and has for its object the provision of a simple and efficient system and method of control for a direct current motor whereby the motor speed will be adjusted in a smooth and uninterrupted manner over an extremely wide range of operating speeds while maintaining a substantially constant horse-power capacity of the motor.

This combination of a very wide speed range and a substantially constant horsepower capacity is required by many equipments, particularly by machine tool drives and the like.

The well known and widely used control system in which a direct current motor operates from a power supply of substantially constant potential and the motor speed is adjusted by controlling the strength of its shunt field excitation, is satisfactory with respect to the two above mentioned requirements to a limited extent only. The speed range available with this method of control is usually limited by the commutation and stability when operating with weakened field at the maximum speed. Thus, the majority of motors available for machine tool equipments have the ratio of their maximum to minimum speeds of about 4:1, which ratio may be made 6:1, and in exceptional cases, 8:1, and then only when the capacity of the equipments is quite small.

Another well known system which contemplates the control of the motor speed by varying the applied voltage, as in the Ward-Leonard system, or by combining the varying of the applied voltage with the adjustment of the motor shunt field excitation, provides a very wide speed range, but has the fundamental disadvantage for application to the above mentioned equipments in that the horsepower capacity of a direct current motor varies in direct proportion with the applied voltage. Thus, only reduced horsepower output is available at the low speeds, even though the inferior ventilation contingent on reduced operating speeds be neglected. Moreover, this method of control is expensive in that a separate generator is required to control the speed of each motor.

Another well known system of control, which possesses certain limitations with respect to the requirements as to a wide and smooth speed variation together with a constant horsepower capacity, is the drive which comprises two or more direct current motors, the armatures of which may be selectively connected either in series connection to cover the lower portion of the speed range, or in parallel connection with each other to cover the upper portion of the speed range; the armatures of these motors will be connected to a supply source of substantially constant potential and their shunt field excitation will be controlled simultaneously in any well known manner. This method of control possesses the following objectionable characteristics when considered in the light of the above mentioned requirements:

Additional control devices must be provided to be connected in the main armature circuit in order to change the armature connection from series to parallel and vice versa. The change of motor speed does not proceed in a smooth and uninterrupted manner, because when the armature connection is changed, the speed varies in one step in a ratio of approximately 2:1. Furthermore, the available horsepower output with the series connection of the armatures is only half of the horsepower output available when they are connected in parallel.

In carrying my invention into effect in one form thereof, I provide a speed regulating dynamo electric machine mechanically connected to the main motor whose speed is to be controlled. The armatures of the regulating machine and of the motor will be permanently connected in series and will be electrically interconnected with a suitable source of supply, preferably of substantially constant potential. By controlling the excitation of the regulating machine, I cause the latter either to oppose, or to assist the line voltage and vary therefore, the voltage impressed on the armature of the main motor. Thus, the main motor will be caused to operate at speeds either below or above its normal speed range as determined by the adjustment of its field strength. Moreover, I provide a single means for regulating the field adjusting means of both the motor and the speed regulating machine and so arrange the field adjusting means that the motor may be caused to operate from its lowest to its highest speed and vice versa or at any intermediate speed merely by operating the common field regulating means. Thus, the speed regulating machine will be automatically transformed from motor to generator operation and vice versa, as desired, and the fields of both the motor and speed regulating machine will be properly controlled so as to produce a very wide range of operating speeds in a simple, convenient and efficient manner.

For a more complete understanding of my invention, reference should be had to the accompanying drawing, the single figure of which illustrates in diagrammatical form a system of control embodying my invention.

Referring to the drawing, I have shown my invention in one form in connection with a direct current motor provided with a direct current speed regulating dynamo electric machine with which the motor is mechanically and electrically inter-connected. As shown, the armature of the direct current motor 10 is electrically connected in series relation with the armature of the direct current speed regulating dynamo machine 11 and is mechanically connected so as to be operated in synchronism therewith by any suitable means as by means of a shaft 12 common to both of the armatures.

The armatures of the machines 10 and 11, which are electrically connected in series, are electrically connected with a suitable source of direct current supply 13. Preferably the source of supply 13 should be of a substantially constant potential. The separately excited field winding 14 of the motor 10 and likewise the separately excited field winding 15 of the regulating machine 11 are conveniently energized from the direct current supply source 13. It will be understood, however, that any other suitable substantially constant source of supply may be provided for these field windings.

In order to suitably control the field of the motor 10 and also that of the regulating machine 11, I provide the motor field circuit with a suitable adjusting rheostat 16 and provide the regulating machine field circuit with a plurality of suitable adjusting rheostats 17 and 18. It will be observed that the rheostats 17 and 18, provided for adjusting the field 15 of the regulating machine, are arranged as a double potentiometer rheostat. Thus, with the contact arms in their respective positions, shown in the drawing, the machine 11 will be operated as a motor, the field of which may be varied by suitably regulating the portions 17—$a$ and 18—$a$ of the rheostats 17 and 18 respectively. Should these contact arms be moved in a clockwise direction, as viewed in the figure, so as to be brought into engagement with the portions 17—$b$ and 18—$b$ of the respective rheostats the field 15 will be reversed so as to cause the regulating machine 11 to operate as a generator, the field of which may be varied by suitably regulating the rheostat portions 17—$b$ and 18—$b$. It will be observed that the rheostat portions 17—$a$, 18—$a$, 17—$b$ and 18—$b$ may be separate rheostats controlled by suitable contact arms.

I so arrange the rheostat 16 with respect to the rheostats 17 and 18 and further provide such control means for effecting their adjustment that any speed within the operating range of the drive will be obtained in a smooth and uninterrupted manner. A suitable operating device common to all of the rheostats is provided. As shown, a hand wheel 19 is mechanically inter-connected as by means of a common shaft 20 to the contact arms of the respective rheostats. It will be observed that the rheostat 16 is so positioned relative to the rheostat portions 17—$a$ and 18—$a$ that when these latter rheostats are operated to effect an adjustment of the field 15 with the regulating machine 11 operating as a motor, the motor field 14 will be fully excited and will be held at substantially constant value regardless of the position of the contact arms associated with the rheostat portions 17—$a$ and 18—$a$. Thus, when the hand wheel 19 is moved in a clockwise direction from its position 1 to its position 2 the field of the regulating machine 15 will be weakened while the field of the motor 10 will remain fully energized.

As will be observed, the rheostats are further so arranged that when the field 14 of the motor 10 is being controlled by means of the rheostat 16 so as to increase its speed in the customary manner, the voltage impressed upon the regulating machine field 15 will be substantially zero since the contact arms associated with the rheostats 17 and 18 will be in a balanced position with respect to the rheostat portions 17—$a$, 18—$a$, 17—$b$ and 18—$b$. Thus, when the hand wheel 19 is moved between its positions 2 and 3, the motor speed will be controlled by adjusting its field, the regulating machine 11 developing no electromotive force.

Moreover, the rheostats are so arranged that when the control wheel 19 is moved beyond its position 3 in a clockwise direction, the field 15 will be reversed and will be gradually strengthened by continued movement of the hand wheel in this direction. As a result of this operation, the regulating machine 11 will be operated as a generator with a gradually increasing field. During this operation the motor field 14 will be held substantially constant in its relatively low value, since it will be energized from the source 13 with the full resistance 16 connected in series.

It will be understood that this particular sequence of the operation of the rheostats is given for purpose of illustration and that any other suitable desired sequence may be followed.

In operation, the speed of the drive will be controlled by proper adjustment of the hand wheel 19. Thus, assuming that the regulating machine 11 be operated as a motor and that the fields of both the machines 10 and 11 be fully excited, it will be understood that this drive will be operating at its minimum speed. It will be further understood that if the field of the motor 10 be maintained fully energized and the field of the machine 11 be gradually weakened by movement of the hand wheel in a clockwise direction, as viewed in the figure, the counter-electromotive force of the latter will be gradually reduced and, in consequence, the voltage applied to the armature of the motor 10 will be gradually increased. As a result of this operation the speed of the motor 10 will be gradually increased. As the speed of the motor 10 is increased during this operation, its developed horse power will be gradually increased while that developed by the machine 11 will be gradually decreased. The total shaft horse power output, however, will remain substantially constant. Thus, by causing the regulating machine 11 to operate as a motor, the voltage applied to the armature of the motor 10 will be reduced below that which would normally be applied from the supply source and in consequence the motor 10 will be caused to operate at speeds below that which would normally be derived by full motor field strength.

Should the field of the regulating machine 11 be completely removed, as will be the condition when the hand wheel 19 is moved beyond its position 2 in a clockwise direction, the full voltage of the supply source 13 will be applied to the armature of the motor 10 which will run, therefore, at its own minimum, or full field rated speed. When the motor field 15 of the regulating machine has been completely removed the full developed horse power of the motor 10 will be available at the shaft, the windage, copper and frictional losses of the machine 11 being neglected. Thus, the horse power output of the shaft will be practically the same as when the machine 11 was operating as a motor. It will be understood that when the field of the regulating machine 11 has been removed, the armature of this machine will not generate any counter-electromotive force but will serve merely to carry the current required by the motor 10.

If the regulating machine 11 be operated with a substantially zero field and the field 14 of the motor 10 be gradually weakened by continued clockwise movement of the wheel 19 beyond its position 2, the speed of the motor 10 will be increased as in ordinary motor operation, the motor 10 delivering a constant horse power throughout this speed range. When the motor field 14 has been weakened to such a limit that the motor would become magnetically unstable by further weakening of the field, the speed of the motor drive may be further increased by applying a higher voltage to its armature. To this end, the hand wheel 19 will be moved beyond its position 3 in a clockwise direction and in consequence thereof will effect a reversal of the field of the regulating machine 11. As has been explained this operation will cause the machine 11 to operate as a generator whose field may be suitably varied by adjustment of the hand wheel 19 between its positions 3 and 4. Thus, as will be readily understood, if the field 14 be held at a substantially constant relatively low value and the regulating machine 11 be operated as a generator with a constantly increasing field, the voltage generated in the armature of the regulating machine will be gradually increased and will be added to that of the supply source 13. Thus, the motor 10 will be caused to operate at gradually increasing speeds. It will be understood that when the motor 10 is thus operating above its normal speed as determined by field adjustment, its horse power output will be increased with the increasing speed. However, part of this output will be supplied mechanically through the shaft 12 to the regulating machine 11. This machine will return this power, neglecting transformation losses, as electrical energy to the armature of the motor 10. As will be obvious, if transformation losses be neglected, the net horse power output of the shaft of the drive will be approximately the same as when the motor was being operated at either its lower or intermediate speeds.

It will be observed, therefore, that merely by turning the single operating hand wheel 19 in a clockwise direction from its position 1 to its position 4, the entire speed range of the motor will be covered in a smooth and uninterrupted manner. Thus, such movement of the hand wheel 19 first effects the gradual decrease in the field strength of the regulating machine 11 which will be operating as a motor, while permitting the motor 10 to operate with its maximum field strength. Continued movement of the hand wheel effects a gradual decrease in the field strength of the motor 10 while permitting the machine 11 to be operated with zero field. Further movement automatically transforms the regulating machine into a generator and thereafter effects a gradual increase in its field strength, the motor 10 operating during this last condition of operation with a substantially constant weakened field.

It will be understood that it is not necessary to employ the rheostats 17 and 18 arranged as a double potentiometer rheostat, but that a single rheostat with field reversing contactors for the regulating machine 11 may be employed. This latter arrangement, however, will not change the principle nor the smoothness of operation.

It is to be noted in particular that the two machines 10 and 11 may be selected to have any desired relative size and that the speed range of the drive will be varied in accordance with the selection of these machines.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with a direct current motor, of a speed regulating dynamo electric machine for said motor having its armature electrically connected in series relation with the armature of said motor and mechanically connected therewith, means for adjusting the field strength of said motor, means for adjusting the field strength of said regulating machine, means for controlling the field of said regulating machine so that said machine may be operated either as a motor or as a generator and a single means for operating both said field adjusting means for said regulating machine and the field controlling means therefor.

2. The combination with a direct current motor, of a dynamo electric machine electrically and mechanically interconnected with said motor for regulating the speed thereof, a rheostat for adjusting the field strength of said motor, a second rheostat for adjusting the field strength of said dynamo electric machine so that said machine can be operated either as a motor or as a generator with an adjustable field strength, and a common operating member for both of said field adjusting rheostats.

3. The combination with a direct current motor having a driving member of a dynamo electric machine having a rotor member mechanically interconnected with said driving member so that a substantially constant speed ratio is maintained between said driving member and said rotor member, means for adjusting the field strength of said motor, means for adjusting the field strength of said dynamo electric machine and for controlling said field so that said machine may be operated either as a motor or as a generator, a single means for operating both of said field adjusting means for said motor and said dynamo electric machine and for further controlling the field controlling means provided for said dynamo electric machine, and means for electrically interconnecting the armatures of said motor and said dynamo electric machine in series relation so that the speed of said motor is regulated by controlling the adjustments of said field strengths and the motor-generator operation of said dynamo electric machine.

4. A system of electrical control comprising a direct current motor, a dynamo electric machine electrically and mechanically interconnected with said motor for regulating the speed thereof, means comprising a plurality of rheostats connected to regulate the field strengths of said motor and said dynamo electric machine and a single means for adjusting said rheostats, said rheostats being operably associated so that when said dynamo electric machine is operated to adjust the speed of said motor, said motor is operated with a substantially constant field strength and when the field of said motor is being adjusted said dynamo electric machine is operated with substantially zero field.

5. The combination with a direct current electric motor, of a direct current dynamo electric machine having its armature mechanically connected with the armature of said motor and electrically connected in series therewith, a substantially constant potential source of electrical supply for said motor and said dynamo machine, rheostatic control means for the field of said motor, rheostatic control means for the field of said dynamo machine connected so that said machine may be caused to operate either as a motor or as a generator and a single means for operating both of said rheostatic control means.

6. A system of electrical control comprising a direct current motor, a dynamo electric machine having its armature electrically connected in series relation with the armature of said motor and mechanically connected therewith and means for controlling the field strength of said motor and the strength and polarity of the field of said dynamo electric machine comprising rheostatic regulating means and a single means for operating said rheostatic regulating means.

7. The combination with a direct current motor, of a dynamo electric machine electrically and mechanically interconnected with said motor for regulating the speed thereof, rheostatic control means for the field of said motor, rheostatic control means for the field of said regulating machine so that said machine may be caused to operate either as a motor or as a generator and common operating means for said rheostatic control means, said rheostatic control means being operably associated so that when said regulating machine is being operated either as a motor or as a generator, said motor will be operated with substantially constant excitation.

8. The combination with a direct current electric motor, of a direct current dynamo electric machine having its armature mechanically connected with the armature of said motor and electrically connected in series relation therewith, an adjusting rheostat connected to control the field of said motor, a plurality of adjusting rheostats connected to control the field of said dynamo electric machine so that said machine may be operated either as a motor or as a generator and a single means for operating said rheostats, said rheostats being operably related so that when said motor is operated with a substantially constant field of relatively high value said dynamo machine will be operated as a motor with an adjustable field, when said motor is operated with an adjustable field said dynamo machine will be operated with substantially zero field and when said motor is operated with a substantially constant field of relatively low value said dynamo machine will be operated as a generator with an adjustable field.

9. A system of electrical control comprising a direct current electric motor provided with field windings, a speed regulating direct current dynamo electric machine provided with field windings and having its armature mechanically coupled with the armature of said motor and electrically connected in series therewith, a substantially constant source of electrical supply for said motor and said regulating machine, an adjusting rheostat included in the field circuit of said motor and a plurality of adjusting rheostats included in the field circuit of said speed regulating machine connected so that it may be operated either as a motor or as a generator with a variable field, said rheostats being operably associated with said first rheostat so that when said regulating machine is being operated either as a motor or as a generator, said motor will be operated with substantially constant excitation.

10. A system of motor control comprising a direct current motor having separately excited field windings, a speed regulating direct current dynamo electric machine having separately excited field windings, said motor and said regulating machine having their armatures electrically connected in series relation and mechanically coupled together, a substantially constant potential source of electrical supply for said motor and said speed regulating machine, a rheostat included in the field winding circuit of said motor, a plurality of rheostats included in the field winding circuit of said speed regulating machine connected so that said machine may be operated either as a motor or as a generator with a varied field whereby the speed of said motor is decreased or increased beyond its normal field adjustment speed range, and a single means for operating said adjusting rheostats, said rheostats being operably related so that when said control means is continuously moved from its low speed position toward the high speed position, said regulating machine is operated as a motor with a gradually decreasing field while the field of said motor is held at a substantially constant relatively high value, then the field of said motor is gradually reduced while the field of said speed regulating machine is held at substantially zero value, and thereafter said speed regulating machine is operated as a generator with a gradually increasing field while the field of said motor is held at a substantially constant relatively low value.

11. The method of controlling an electric motor provided with a speed regulating machine, the latter being mechanically and electrically interconnected with said motor, which comprises operating said regulating machine as a motor and weakening its field while maintaining a substantially full field on said motor, then weakening the field of said motor while maintaining a substantially zero field on said regulating machine and then building up the field of said regulating machine in the opposite direction, whereby said regulating machine operates as a generator, while maintaining a field of substantially minimum value on said motor.

12. The method of controlling an electric motor provided with a speed regulating machine, the latter being mechanically and electrically interconnected with said motor, which comprises operating said regulating machine as a motor and varying its field while maintaining a substantially constant field on said motor so that said motor is operated at speeds below its minimum, or full field rated value, then varying the field of said motor while maintaining a substantially constant field on said regulating machine so that said motor is operated within its normal speed range and then converting said regulating machine into a generator and varying its field while maintaining a substantially constant field on said motor so that said motor is operated at speeds above its maximum, or minimum field rated value.

13. The method of controlling an electric motor provided with a speed regulating machine, the latter being mechanically interconnected and electrically connected in series with said motor, which comprises operating said regulating machine as a motor and gradually weakening its field while maintaining a substantially constant field of relatively high value on said motor, then gradually weakening the field of said motor while maintaining a substantially zero field on said regulating machine and then converting said regulating machine into a generator and gradually strengthening its field while maintaining a substantially constant field of relatively low value on said motor.

In witness whereof, I have hereunto set my hand this 29th day of December, 1928.

LEONID A. UMANSKY.